(12) United States Patent
Yin

(10) Patent No.: US 7,471,506 B2
(45) Date of Patent: Dec. 30, 2008

(54) METHOD AND SYSTEM OF A PORTABLE COMPUTER WITH A DETACHABLE DISPLAY

(75) Inventor: Memphis-Zhihong Yin, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 356 days.

(21) Appl. No.: 10/947,013

(22) Filed: Sep. 22, 2004

(65) Prior Publication Data

US 2006/0061948 A1    Mar. 23, 2006

(51) Int. Cl.
*G06F 1/16* (2006.01)
(52) U.S. Cl. ............. 361/683; 361/681; 248/917; 248/918
(58) Field of Classification Search ......... 361/679–683; 248/917, 918
See application file for complete search history.

(56) References Cited

U.S. PATENT DOCUMENTS

| 5,805,415 | A |   | 9/1998 | Tran et al. |  |
|---|---|---|---|---|---|
| 6,028,764 | A | * | 2/2000 | Richardson et al. | 361/681 |
| 6,304,431 | B1 |   | 10/2001 | Kim |  |
| 6,512,670 | B1 |   | 1/2003 | Boehme et al. |  |
| 6,590,547 | B2 |   | 7/2003 | Moriconi et al. |  |
| 6,593,859 | B1 | * | 7/2003 | Watanabe | 341/20 |
| 6,882,524 | B2 | * | 4/2005 | Ulla et al. | 361/680 |
| 2001/0048586 | A1 | * | 12/2001 | Itou et al. | 361/681 |
| 2003/0043534 | A1 | * | 3/2003 | Tsai et al. | 361/683 |
| 2003/0112585 | A1 | * | 6/2003 | Silvester | 361/679 |
| 2003/0198008 | A1 | * | 10/2003 | Leapman et al. | 361/681 |

FOREIGN PATENT DOCUMENTS

| CN | 1484137 | 3/2004 |
|---|---|---|
| JP | 05107611 A | 4/1993 |
| JP | 10301668 A | 11/1998 |
| JP | 2000005954 A | 1/2000 |
| JP | 2001125673 A | 5/2001 |
| JP | 2002124226 A | 4/2002 |
| JP | 2002215265 A | 7/2002 |

OTHER PUBLICATIONS

Office Action dated Jan. 31, 2008, Japanese Patent Application No. 2005-275117, 2 pp.

\* cited by examiner

*Primary Examiner*—Jayprakash N Gandhi
*Assistant Examiner*—Anthony Q Edwards

(57) ABSTRACT

A method and system of a portable computer with a detachable display. Some illustrative embodiments may be a portable computer comprising a base unit comprising a main battery, and a display unit coupled to the base unit. The display unit is selectively detachable from the base unit, and wherein the base unit wirelessly couples to the display device.

12 Claims, 3 Drawing Sheets

METHOD AND SYSTEM OF A PORTABLE COMPUTER WITH A DETACHABLE DISPLAY

BACKGROUND

Portable computers, such as laptop and/or notebook computers, have an advantage over their desktop brethren in that they may be operated in remote locations, sometimes by way of battery power. However, what portable computers gain in portability, they may lose in ergonomics. In particular, portable computers may have an undersized keyboard (relative to a full size keyboard available for a desktop unit). Moreover, there is usually a fixed relationship between the integral display and the keyboard, which may make it difficult for a user to create an ergonomic working environment. Moreover, the fixed relationship between the integral display and keyboard may make it difficult to use the portable computer in other capacities, such as making a presentation to a group of people.

SUMMARY

The problems noted above are solved in large part by a method and system of a portable computer with a detachable display. Some illustrative embodiments may be a portable computer comprising a base unit comprising a main battery, and a display unit coupled to the base unit. The display unit is selectively detachable from the base unit, and wherein the base unit wirelessly couples to the display device.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections.

DETAILED DESCRIPTION

Figure 1:
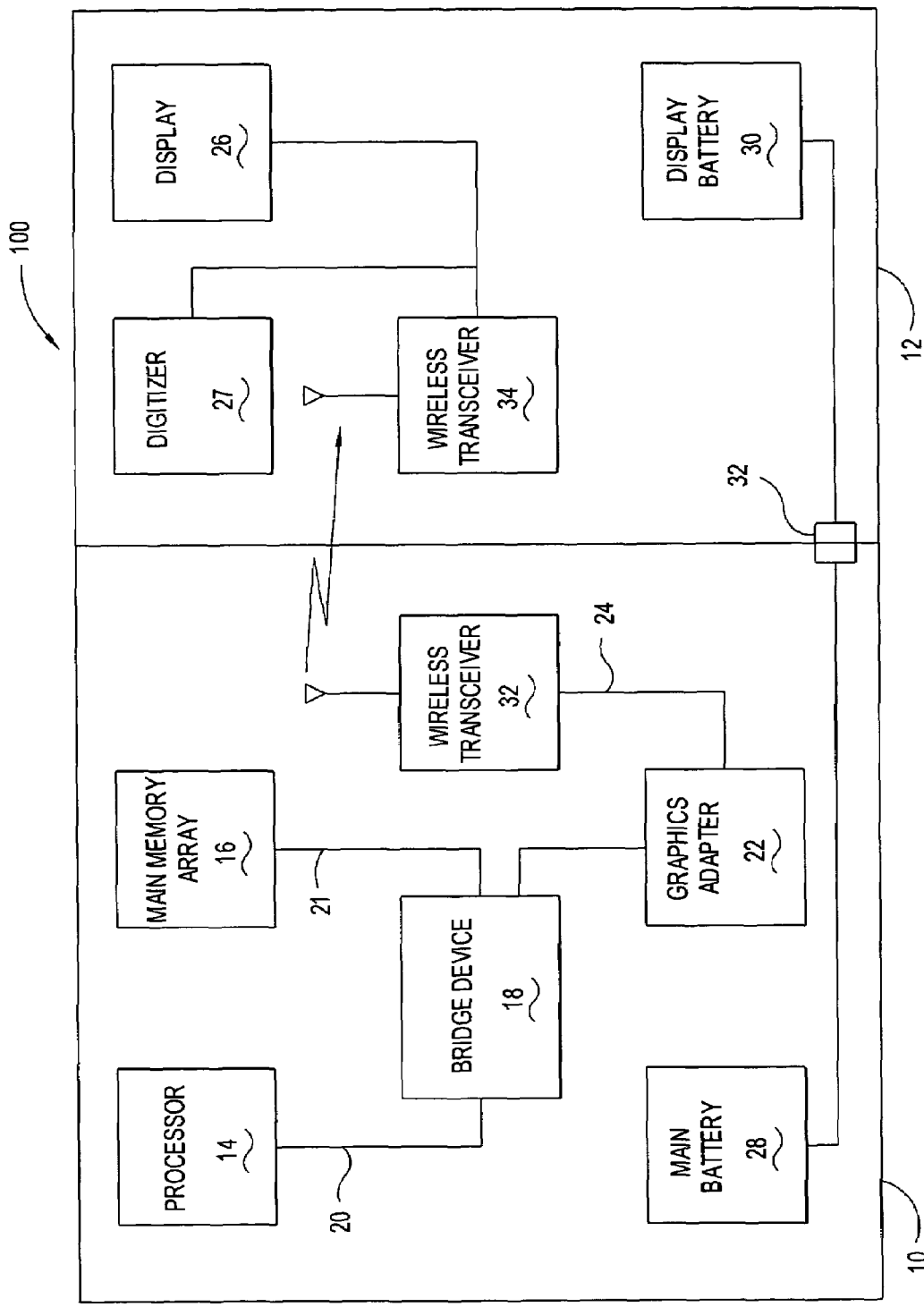
FIG. 1 illustrates an electrical block diagram of a portable computer 100 constructed in accordance with embodiments of the invention.

FIG. 1 illustrates an electrical block diagram of a portable computer 100 constructed in accordance with embodiments of the invention. In a broad sense, the portable computer comprises two major components: a base unit 10 and a detachable display unit 12. Each of these will be discussed in turn.

The base unit 10 comprises a processor 14 coupled to a main memory array 16, possibly by way of a bridge device 18. The processor 14 may be any currently available or after-developed processor. Main memory array 16 may be random access memory (RAM), and may be in the form of a single RAM device, or an array of RAM devices. Bridge device 18 couples to the processor 14 by way of a host bus 20 and to the main memory array 16 by way of a memory bus 21. The bridge device 18 controls the processor's access to the main memory array 16.

Base unit 10 further comprises a graphics adapter 22 which couples to the processor 14, possibly by way of the bridge device 18. In some embodiments, the graphics adapter 22 couples to the bridge device 18 by way of an Advanced Graphics Port (AGP) bus 24, although any currently available or after-developed bus may be used. The graphics adapter 22 is responsible for receiving graphics primitives generated by a program executing on the processor 14, and translating those graphics primitives into images suitable for display on the display device 26. The base unit 10 may further comprise a main battery 28 that provides power at least to the various components of the base unit 10.

The portable computer 100 further comprises a display unit 12 that comprises the display 26, such as a liquid crystal display (LCD), as well as a display battery 30. In some embodiments, a digitizer 27 may overlay the display 26, thus enabling handwritten input to the base unit 12 through the display unit 12. In accordance with embodiments of the invention, the display unit 12 of the portable computer 100, in a first configuration, is physically attached to the base unit 10. In a second configuration, the display unit 12 is physically detached from the base unit 10, thus allowing the user to ergonomically place the display unit 12 and/or position the display unit 12 in such a manner that others may see the display contents, such as during a presentation to a group of people.

When the portable computer 100 has its base unit 10 and display unit 12 attached, the main battery 28 and the display battery 30 are electrically coupled by way of a coupling 32. In this way, supply of power to the various components of the portable computer 100 is shared by both the main battery 28 and the display battery 30. Moreover, both the main battery 28 and the display battery 30 may be simultaneously charged in the coupled configuration illustrated in FIG. 1. In alternative embodiments, the display 26 draws power only from the main battery 28 when the base unit 10 and display unit 12 are attached. In yet further alternative embodiments, the display 26 draws power only from the display battery 30, even if the display battery 30 and main battery are being simultaneously charged.

In order to facilitate communication of data from the graphics adapter 22 to the display device 26 in the embodiments of the invention when the display unit 12 is separated or detached from the base unit 10, the base unit 10 further comprises a wireless transceiver 32 coupled to the graphics adapter 22. Likewise, the display unit 12 may have a wireless transceiver 34 coupled to the display 26. Thus, the graphics adapter 22 couples to the display device 26 wirelessly, using the wireless transceivers 32 and 34. Any currently available or after-developed wireless communication system may be utilized in the communications between the wireless transceiver 32 and the wireless transceiver 34, e.g., Bluetooth, IEEE 802.11, and/or other form of electromagnetic radiation based communication. In some embodiments, the communication from the base unit 10 to the display unit 12 of the display contents is a one-way communication. In alternative embodiments, the wireless transceiver 34 is capable of verifying the veracity of communications between the base unit 10 and the display unit 12, and thus may have the capability of requesting resend of some of the information if there is data loss in the communication.

Figure 2:
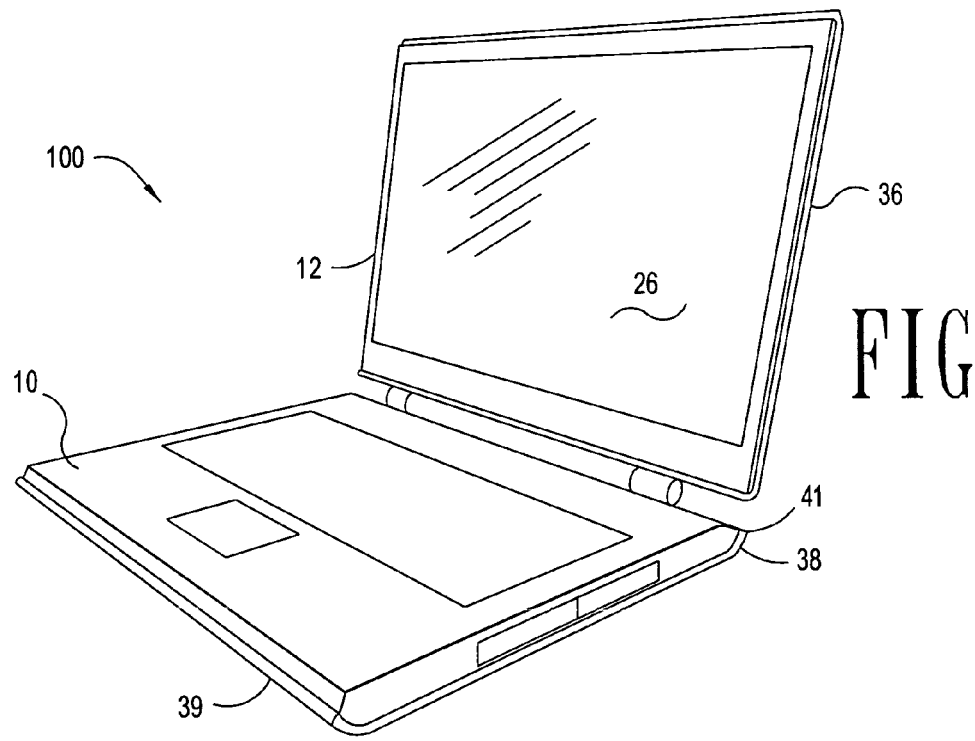
FIG. 2 illustrates the portable computer in a first configuration in accordance with embodiments of the invention.

FIG. 2 shows a perspective view of the portable computer 100 having the base unit 10 coupled to the display unit 12. The display unit 12 comprises the display 26, as well as an outer cover 36 and a base cover 38. In this coupled configuration, the base unit 10 sits on and couples to the base cover 38. As illustrated in FIG. 2, the base cover 38 has a rounded front edge 39 and a rounded back edge 41. The elevational difference between the tops of the front edge 39 and back edge 41, in relation to an inside bottom of the cover 38 upon which the base unit 10 sits, defines a volume within which the base unit 10 at least partially resides when the base unit 10 is coupled to the display unit 36.

Figure 3:
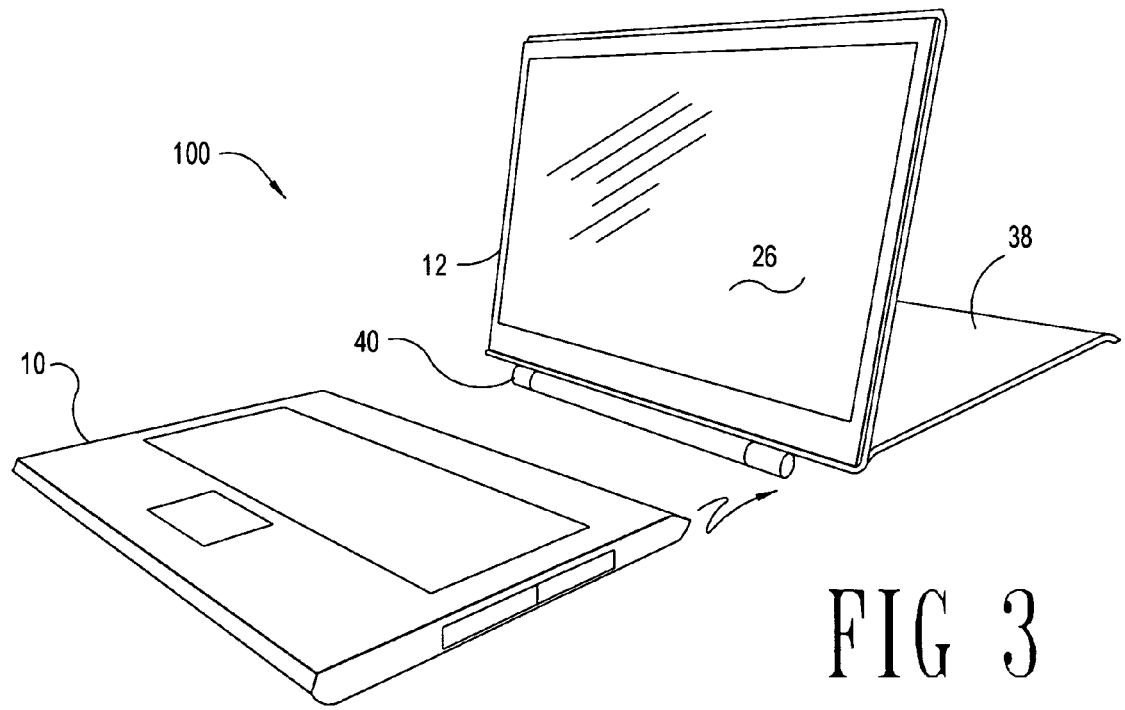
FIG. 3 illustrates the portable computer in a second configuration in accordance with embodiments of the invention.

FIG. 3 shows the portable computer 100 with the base unit 10 detached from the display unit 12. In this configuration, the base cover 38 rotates about hinge 40 to become a pedestal or stand orienting the display 26 in a substantially upright configuration. In the configuration illustrated in FIG. 3, video images are wirelessly transmitted from the base unit 10 to the display unit 12, such as by wireless transceivers 32 and 34 (shown in FIG. 1). Moreover, the display battery 30 is decoupled from the main battery 28, and the display 26 is operated from power provided from the display battery 30 (FIG. 1), Likewise, in the detached configuration the base unit 10 is operated from power supplied from main battery 28 (again FIG. 1).

Figure 4:
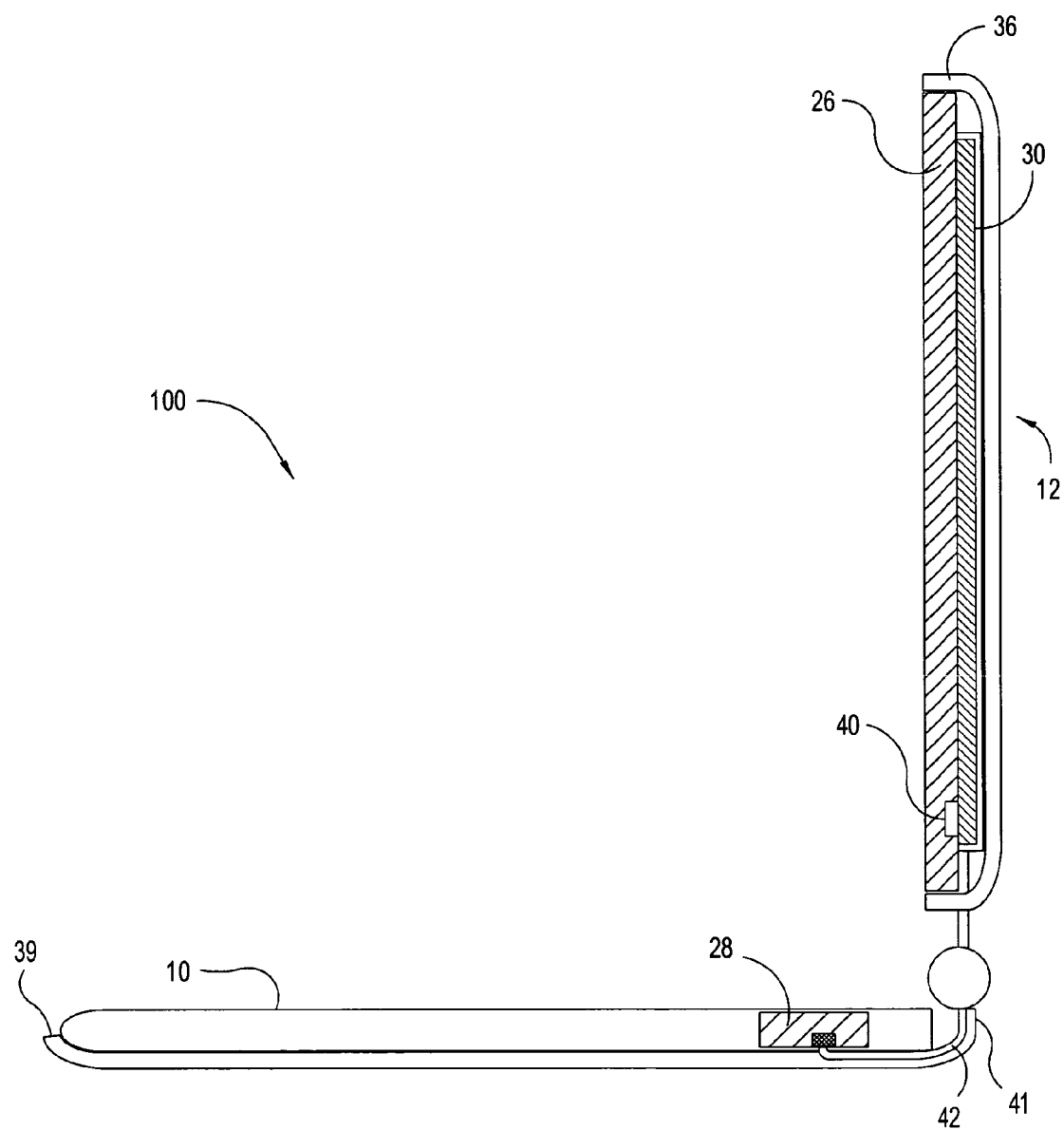
FIG. 4 illustrates a partial cross-sectional view of the portable computer in accordance with embodiments of the invention.

FIG. 4 shows a partial elevational and cross-sectional view of the portable computer 100 with the base unit 10 attached to the display unit 12 to illustrate placement of the display battery 30 in accordance with at least some embodiments of the invention. In particular, the display unit 12 comprises display 26 coupled within display cover 36. The display battery 30, in accordance with embodiments of the invention, is disposed in a "sandwich" manner between the display 26 and display cover 36. Alternatively, the battery 30 couples to an outside portion of the display cover 36, and thus the display cover 36 may be sandwiched between the display 26 and the battery 30. Battery 30 may thus have a rectangular shape, and be relatively thin, such that the overall thickness of the portion of the display unit 12 containing the battery 30 will not be disproportionately large. Any currently available or after-developed battery system that may be formed into a rectangular shape may be used in embodiments of the invention. For example, some of the PowerPad devices available from Electrovaya, Mississauga, Ontario, Canada, may be used in the disclosed embodiments.

Still referring to FIG. 4, the display battery 30 couples to the display by way of a coupler 40. Coupler 40 also electrically couples, through wires 42, the display battery 30 to the main battery 28, through coupler 32. Thus, when the portable computer 100 is being charged by external sources, e.g., by cord from available power outlet, or an external battery, those sources devices simultaneously charge main battery 28 and display battery 30.

The above discussion is meant to be illustrative of the principles and various embodiments of the present invention. Numerous variations and modifications will become apparent to those skilled in the art once the above disclosure is fully appreciated. For example, while only one base unit and display unit are shown, the base unit may broadcast to multiple display units, though not all of these display units may attach to the base unit. Moreover, in alternative embodiments the display battery and the display may couple on opposite sides of the display cover.

What is claimed is:

1. The portable computer comprising:
   a base unit comprising a main battery; and
   a display unit coupled to the base unit, the display unit comprising a display device and a display battery, wherein the display unit is selectively detachable from the base unit, and wherein the base unit wirelessly couples to the display device;
   a base cover hinged to the display unit, a portion of the base cover defining a plane, and the base cover further comprising at least one of a front edge or a back edge elevationally different than the plane defined by the portion of the base cover;
   wherein the elevational difference between the at least one of a front edge or a back edge and the plane defined by the portion of the base cover defines a volume, and wherein the base unit resides at least partially within the volume when the base unit and display unit are not detached.

2. The portable computer as defined in claim 1 further comprising:
   wherein the base unit further comprises a graphics adapter; and
   wherein the graphic adapter wirelessly couples to the display device.

3. The portable computer as defined in claim 1 wherein the display unit further comprises a digitizer in operational relationship to the display device, and wherein data from the digitizer is wirelessly coupled to the base unit.

4. The portable computer as defined in claim 2 further comprising:
   a wireless communication device coupled to the graphics adapter in the base unit; and
   a wireless communication device coupled to the display device in the display unit;
   wherein the base unit wirelessly communicates to the display device by way of the wireless communication devices.

5. The portable computer as defined in claim 2 wherein the graphics adapter wirelessly couples to the display device when the display unit is detached from the base unit.

6. The portable computer as defined in claim 2 further comprising:
   a wireless communication device in the base unit; and
   a wireless communication device coupled to the display device in the display unit;
   wherein the base unit wirelessly communicates to the display device by way of the wireless communication devices.

7. A method comprising:
   separating, on a portable computer, a display unit comprising a display device and a display battery from a base unit comprising a processor and a main battery, the separating by removing the base unit from at least partially within a volume defined at least in part by a base cover, the base cover hinged to an outer cover of the display device;
   powering the display device by the display battery; and
   wirelessly communicating to the display device from the base unit.

8. The method as defined in claim 7 wherein wirelessly communicating further comprises wirelessly communicating images to the display device.

9. The method as defined in claim 7 wherein separating further comprises electrically de-coupling the main battery from the battery disposed between the display device and the outer cover.

10. The method as defined in claim 7 wherein wirelessly communicating further comprises communication images to the display device from the base unit with electromagnetic radiation.

11. A portable computer system comprising a base unit comprising the processor;
   a main memory array coupled to the processor;
   a display unit comprising:
      a display device;
      a display battery;
      a display cover, wherein the display battery is disposed between the display device and the display cover;
      a base cover hinged to the display cover, a portion of the base cover defining a plane, and the base cover further comprising at least one of a front edge or a back edge elevationally different than the plane defined by the portion of the base cover;
      wherein the elevational difference between the at least one of a front edge or a back edge and the plane defined by the portion of the base cover defines a volume, and wherein the base unit resides at least partially within the volume when the base unit and display unit are not detached;
   a graphic adapter coupled to the processor, and the graphics adapter wirelessly coupled to the display device when the display device and the processor are integral to the portable computer system;
   wherein the display unit is selectably detachable from the base unit, and when detached the display unit operates from power provided by the display battery.

12. The portable computer as defined in claim 11 wherein both the front and back edge are elevationally different than the plane defined by the base cover.

* * * * *

UNITED STATES PATENT AND TRADEMARK OFFICE
CERTIFICATE OF CORRECTION

PATENT NO. : 7,471,506 B2 Page 1 of 1
APPLICATION NO. : 10/947013
DATED : December 30, 2008
INVENTOR(S) : Memphis-Zhihong Yin It is certified that error appears in the above-identified patent and that said Letters Patent is hereby corrected as shown below:

In column 4, line 6, in Claim 1, delete "The" and insert -- A --, therefor.

Signed and Sealed this

Twenty-eighth Day of April, 2009

JOHN DOLL
*Acting Director of the United States Patent and Trademark Office*